United States Patent [19]

Steilen

[11] 4,337,835
[45] Jul. 6, 1982

[54] SCRAPER FOR DOUBLE DISK FURROW OPENER

[75] Inventor: Ronald M. Steilen, Ankeny, Iowa

[73] Assignee: Deere & Company, Moline, Ill.

[21] Appl. No.: 228,033

[22] Filed: Jan. 23, 1981

[51] Int. Cl.³ ............................................ A01B 23/06
[52] U.S. Cl. .................................... 172/560; 172/575
[58] Field of Search ............... 172/560, 561, 562, 566, 172/558, 575

[56] References Cited

U.S. PATENT DOCUMENTS 733,593 7/1903 Poirier .
734,017 7/1903 Van Brunt ........................ 172/560
734,018 7/1903 Van Brunt ........................ 172/560
1,018,220 2/1912 Van Brunt .
1,079,140 11/1913 Packham ........................... 172/575

Primary Examiner—Richard J. Johnson

[57] ABSTRACT

A scraper assembly for a double disk furrow opener having a hinge bracket bolted rigidly to the cast boot assembly. Scrapers are supported by the hinge bracket and urged against the inside of the blades by a leaf spring. The bolt holds the relative position of the assembly to prevent the scrapers from overhanging the edge of the disk blades, and the leaf spring allows individual scraper action.

14 Claims, 7 Drawing Figures

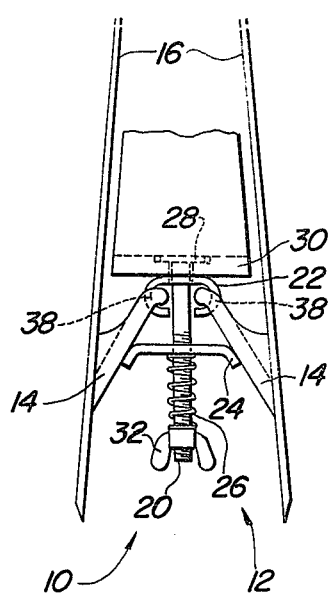
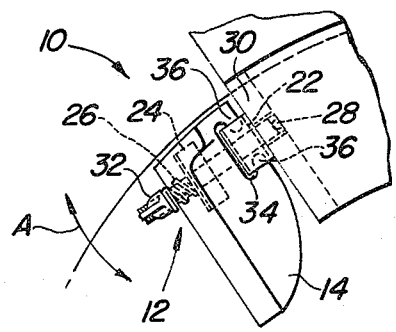
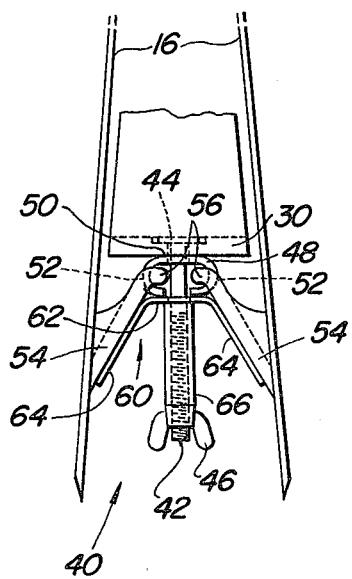
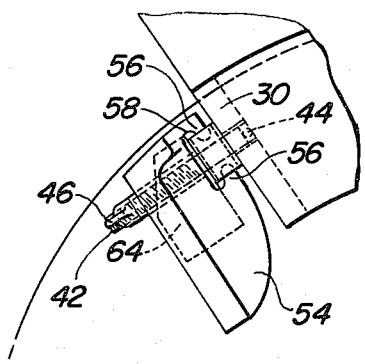
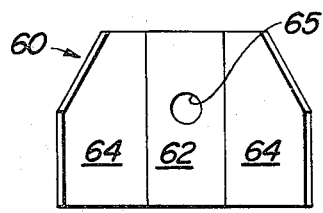

SCRAPER FOR DOUBLE DISK FURROW OPENER

BACKGROUND OF THE INVENTION

The present invention relates generally to planting equipment and more specifically to a scraper assembly for removing soil from disk blades.

In many soil conditions where double disk furrow openers are used on planting equipment, it is necessary to provide scrapers between the disk blades to remove soil which clings to the blades. The scrapers must apply a light pressure against the disk blades and each scraper must be free to move relative to the blade to compensate for variation to wobble in the blade. To provide this freedom of movement for the scrapers, they are normally attached to the structure with a loosely bolted and lightly compressed spring loaded connection including a pressure clip urging the scrapers outwardly. The loose connection permits the entire scraper assembly to rock up and down, and the scrapers can actually overhang the edge of the blades and be grooved by the rotating blades. Such grooves cause rapid wear on both the scraper and the blades and can stop the blades from turning. A stopped blade results in erratic seed spacing in the row.

The pressure clip which urges the scrapers against the blades can prevent free movement of the scrapers, and friction between the scrapers and the clip causes the parts to wear. If dirt or mud builds up on the compression spring acting against the clip, or if heavy paint covers the spring, the scrapers can become inoperable.

It is therefore an object of the present invention to provide an improved scraper assembly for a double disk furrow opener.

It is a further object to provide a scraper assembly for a double disk blade opener which is rigidly connected to the seed boot or other support between the disk blades and yet provides uniform scraper pressure against the blades.

It is still another object to provide a scraper assembly for a double disk blade opener which prevents the scrapers from overhanging the blades and from being grooved thereby.

It is yet another object of the invention to provide for a double disk blade opener a scraper assembly with scrapers that are free to move with variations or wobble of the blade and yet are urged against the blades with uniform pressure. It is a further object to provide such an assembly which remains operable even when covered with heavy paint, dirt or mud buildup.

It is still another object of the invention to provide a scraper assembly for a double blade opener in which the scrapers are mounted for providing an even wear pattern as they are urged against the blades.

These as well as other objects, features and advantages will become apparent from the drawings and the detailed description which follows.

BRIEF DESCRIPTION OF THE DRAWINGS

FIG. 3 is a top view of the prior art scraper assembly shown in FIG. 2.

FIG. 4 is a side view of the assembly shown in FIG. 3.

FIG. 5 is a top view of the improved scraper assembly of the present invention.

FIG. 6 is a side view of the scraper assembly of the present invention.

FIG. 7 is a rear view of the leaf spring for the scraper assembly of FIGS. 5 and 6.

Referring to FIG. 1, therein is shown a conventional grain drill 6 on which are mounted a plurality of transversely spaced double disk blade opener assemblies 8. The drill 6 is pulled forwardly over the ground, and the opener assemblies 8 form furrows which receive seeds from a metering and distribution system on the drill. In certain types of soil, scraper assemblies are necessary to remove dirt build-up from the disk blades.

Figure 2:
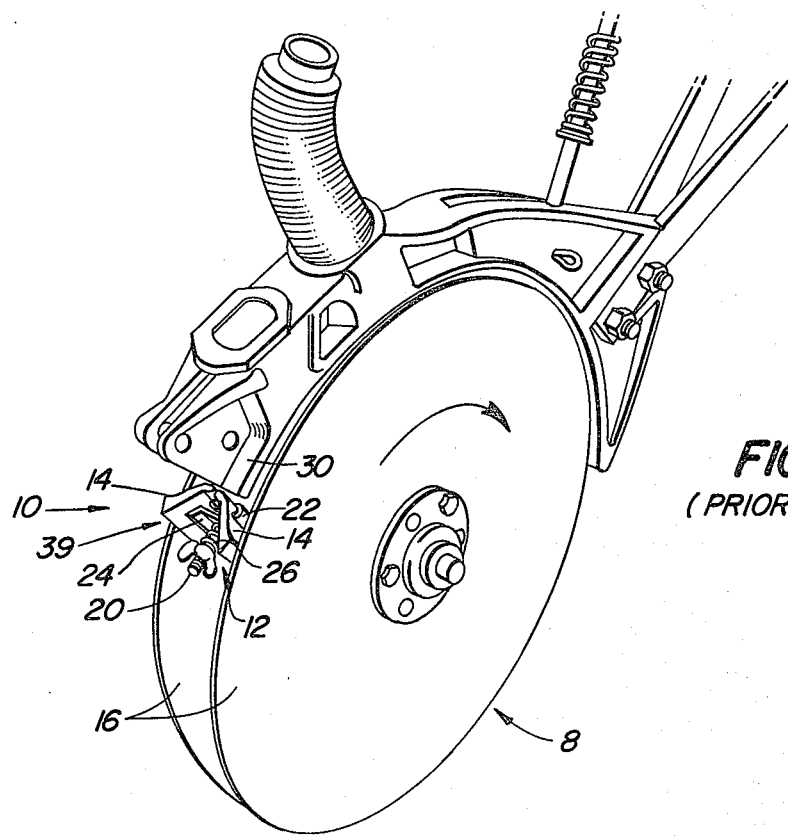
FIG. 2 is a perspective view of a prior art scraper assembly on a double disk blade assembly wherein the scrapers are overhanging the blades.

The prior art scraper assembly, shown generally at 10 in FIGS. 2–4, includes a spring loaded connection 12 mounting a pair of scrapers 14 and biasing them against the inside of disk blades 16 on the double disk blade assembly 8. The spring loaded connection 12 includes a generally rearwardly extending pin or bolt 20 which supports a hinge 22, a pressure clip 24, and a compression spring 26. A retaining pin 28, is rigidly connected to one end of the bolt 20 and extends transversely to the axis of the bolt and radially outwardly of the shank. The pin end of the bolt 20 is inserted through a hole in a support 30 which has a vertical slot for accommodating the retaining pin 28. After the retaining pin 28 passes through the slotted hole in the support 30, the bolt 20 is turned 90° to move the pin 28 out of alignment with the slot and prevent the bolt from pulling out from the support. A wing nut 22 is threaded over the opposite end of the bolt 20 and is tightened against the compression spring 26 to retain the spring loaded connection 12 on the support 30. The inside edge of each scraper 14 includes a slot 34 and ears 36 to define a hinge connection. U-shaped ends 38 of the hinges are inserted through the slot 34 and rockably support the scrapers 14. The compression spring 26 biases the pressure clip 24 toward the hinge 22 which, as best seen in FIG. 3, urges the scrapers 14 outwardly about the hinge and against the blades 16.

With the arrangement shown in FIGS. 2–4, the spring loaded connection 12 only loosely holds the scraper assembly 10 in position and allows it to rock in the direction indicated by arrow A (FIG. 4). The scrapers 14 can therefore ride up over the edge of the disk blade to a position shown at 39 in FIG. 2 so that grooves are formed as the scrapers wear in the area of contact with the blades. If the compression spring 26 gets caked with dirt or paint, the pressure clip 24 can no longer freely move back and forth along the bolt shank to allow proper movement of the scrapers 14. Wear occurs in the area of frictional contact between the pressure clip 24 and the scrapers 14. Therefore, maintaining uniform scraper pressure and proper scraper alignment have been a problem with the assembly 10.

Referring to FIGS. 5 and 6, therein is shown the improved scraper assembly 40 carried by the support 30. The assembly 40 includes a pin or bolt 42 with a retaining pin 44 and a wing nut 46 generally identical to that shown and described with respect to the prior art assembly 10 of FIGS. 2 and 4. The retaining pin end of the bolt 42 is also inserted through a slotted hole in the support after which the bolt 42 is rotated 90° to prevent the bolt from moving toward the left (as viewed in FIG. 6) out of the support 30.

A hinge 48 includes a forward wall 50 positioned against the support 30, and an aperture through which passes the shank of the bolt 42. Laterally spaced U-shaped ends 52 of the hinge 48 curve rearwardly from the rear wall 50 and terminate adjacent the shank of the bolt 42. Scrapers 54 have ears 56 and slots 58 through which pass the U-shaped ends 52 to rockably support the scrapers 54 on the hinge 48.

A resilient leaf spring 60 (FIG. 7) preferably formed from flat stainless sheet steel includes a generally flat wall or connecting portion 62 having a lateral dimension greater than the diameter of the shank of the bolt 42 and approximately equal to the distance between the scraper receiving ends of the hinge 48. The leaf spring 60 includes generally flat side legs 64 diverging from wall 62. The side legs 64 are coextensive with the upper portions of the scrapers 54. The leaf spring has a vertical dimension which is substantial as compared with the vertical dimension of the scrapes 54 and which is preferably at least ⅓ to ½ that of the scrapers 54. The leaf spring side legs 64 are pressed into contact with a substantial area of the scrapers 54 (FIG. 6) which helps maintain uniform scraper pressure and proper scraper alignment.

The wall 62 of the leaf spring 60 includes an aperture 65 for receiving the shank of the bolt 42. The spring 60 is inserted over the bolt 42 with the flat wall 62 abutting against the U-shaped ends 52 of the hinge 48. A cylindrical spacer 66 is placed over the shank against the wall 62. The wing nut 46 is tightened against the spacer 66 to rigidly secure the spring 60 and hinge 48 against the support 30 so that the assembly cannot rock up and down in the manner such as shown by the arrow A in FIG. 4.

The side legs 64 are positioned flatly against the inside surfaces of the scrapers 54 to bias them outwardly about the hinge 48 and urge them against the blades 16 with uniform pressure. The spacer 66 permits the hinge 48 to be held rigidly against the support 30 so that the scrapers 54 cannot ride up over the blades 16. The spacer 66 has sufficient aixal length to permit convenient access to the wing nut 46 without interference from the leaf spring 60 or scrapers 54.

Figure 1:
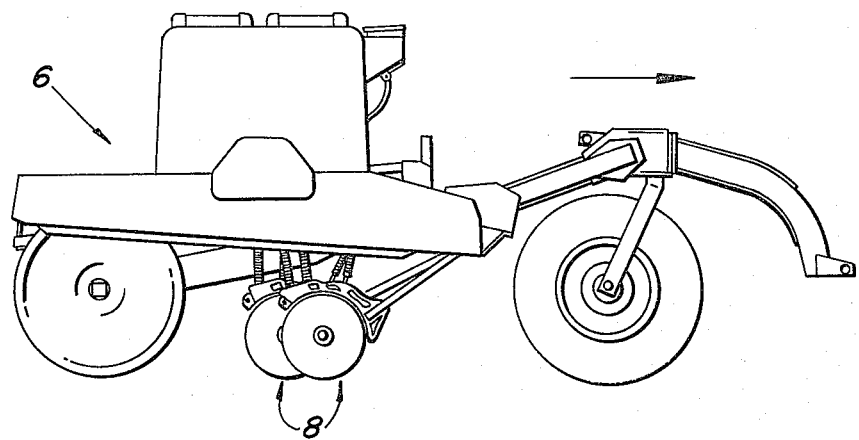
FIG. 1 is a side view of a grain drill on which the scraper assembly of the present invention is mounted.

The leaf spring 60 reliably and uniformly maintains the scrapers 54 in contact with the blades 16 and is not rendered inoperative by paint, dirt or mud build-up. By eliminating the pressure clip 24 (FIG. 3), there is freer movement of the scrapers 54 to accommodate blade wobble and variation, and there is less frictional contact and wear associated with the scrapers. The entire scraper assembly 40 is rigidly secured between the blades 16 and cannot rock up and down like the prior art device shown in FIG. 1. This rigid connection as well as the more uniform pressure and freer movement provided by the leaf spring 60 causes the scrapers 54 to wear more evenly and last longer than scrapers in such an assembly as shown in FIGS. 2-4.

Having described the preferred embodiment it will become apparent that various modifications can be made without departing from the scope of the invention as set forth in the following claims.

I claim:

1. In a double disk blade assembly including a support, and a pair of rotatable blades having inside surfaces, a scraper assembly comprising:
   a hinge rigidly secured to the support between the disk blades;
   a pair of scrapers rockably supported by the hinge and movable against the inside surfaces of the disk blades; and
   a leaf spring supported adjacent the hinge and including biasing portions urging the respective scrapers into engagement with the inside surfaces of the corresponding disk blades.

2. The scraper assembly as set forth in claim 1 further comprising: a bolt extending outwardly from the support, wherein the hinge and leaf spring are mounted on the bolt; a cylindrical spacer inserted over the bolt between the hinge and the outward end of the bolt; and a nut threaded on the outward end of the bolt against the spacer and rigidly securing the spacer, leaf spring and hinge together between the support and the nut.

3. The scraper assembly as set forth in claims 1 or 2 wherein the leaf spring is of unitary resilient sheet metal construction and includes a wall abutting against the hinge and wherein the biasing portions diverge from the wall and are pressed into generally parallel relatinship with the scrapers for uniformly urging them against the blades.

4. The scraper assembly as set forth in claim 3 wherein the biasing portions contact a substantial area of the scrapers.

5. The scraper assembly as set forth in claim 3 wherein hinge width is substantially equal to the width of the leaf spring wall abutting the hinge.

6. In a double disk blade assembly including a pair of blades rotatably mounted and transversely spaced with respect to a support, a scraper assembly comprising:
   a hinge having a pair of laterally spaced ends rigidly connected to the support between the blades; first and second scrapers rockably connected to the respective hinge ends and movable inwardly and outwardly with respect to each other to accommodate variations in the transverse distance between the two disk blades; and
   a leaf spring supported adjacent the hinge and having first and second diverging scraper urging portions for biasing the respective scrapers outwardly with respect to each other into contact with the disk blades.

7. The scraper assembly as set forth in claim 6 further comprising:
   a fore-and-aft extending pin connected at one end to the support and having a distal end located between the disk blades;
   means for mounting the hinge and the leaf spring on the pin including fastening means located on the distal end for releasably urging the hinge and leaf spring against each other and toward the support to prevent the hinge from rocking with respect to the support.

8. The scraper assembly as set forth in claim 7 wherein the fastening means comprise a nut threaded into the distal end of the pin and a spacer carried on the pin between the hinge and the nut.

9. The scraper assembly as set forth in claims 7 or 8 wherein the scrapers diverge outwardly from the hinge and open toward the distal end of the pin.

10. In a double disk blade assembly adapted for forward movement through soil and including a pair of blades rotatably mounted about transversely extending axes relatively fixed with respect to a support, a scraper assembly comprising:
   a generally fore-and-aft extending pin carried by the support between the blades;

a hinge bracket including transversely spaced hinge ends supported on the pin;

a pair of scrapers supported between the blades by the hinge ends and swingable thereon for movement outwardly with respect to each other against the blades;

a spring having a transversely extending connecting portion supported by the pin adjacent the hinge bracket and a pair of generally planar surfaces diverging outwardly from the connecting portion and resiliently urged toward the scrapers for biasing them outwardly against the blades; and securing means for preventing movement of the hinge bracket with respect to the support.

11. The scraper assembly as set forth in claim 10 wherein the securing means comprise:

a nut threaded over the end of the pin opposite the support and spacer means compressed between the nut and the hinge bracket.

12. A scraper assembly adapted for mounting on a support member of a double disk blade assembly, the scraper assembly comprising:

a bolt member having a first end adapted for mounting in the support member and a second end adapted for extending between the blades when the first end is mounted in the support member;

a hinge bracket supported on the bolt member adjacent the first end and including a pair of hinge portions spaced on opposite sides of the bolt member;

a pair of scrapers rockably carried by the hinge portions and swingable between inwardly and outwardly extending positions;

a leaf spring having a plurality of generally flat, planar surfaces, including a connecting portion carried on the bolt member adjacent the hinge portion and a pair of leg members diverging outwardly from the connecting portion to bias the scrapers to the outwardly extending position; and means for releasably securing the hinge bracket and leaf spring rigidly on the bolt member.

13. The scraper assembly as set forth in claim 12 wherein the means for releasably securing comprises a nut threaded into the second end and adjustable thereon to urge the leaf spring and hinge bracket toward the first end.

14. The scraper assembly as set forth in claims 12 or 13 wherein the hinge bracket and connecting portion are substantially parallel and wherein the leg members are joined to and diverge from the connecting portion immediately adjacent the hinge portion so that the leg members contact the scrapers adjacent their connection to the hinge bracket.

* * * * *